(No Model.)
H. ESSER.
MEASURING SCALE.
No. 431,568. Patented July 8, 1890.
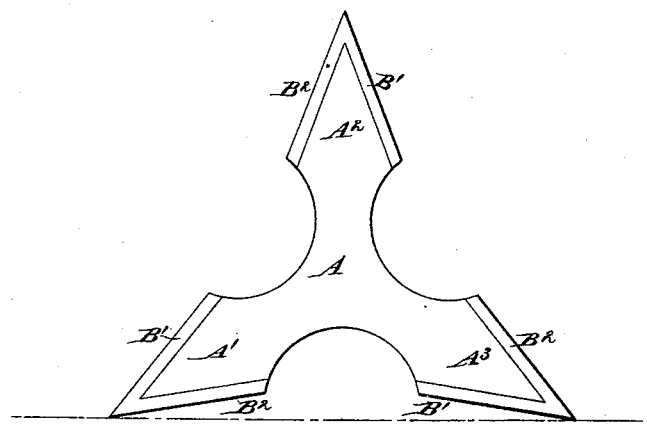
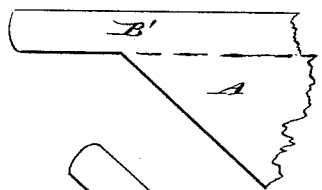 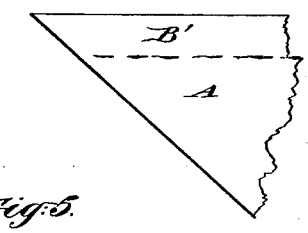 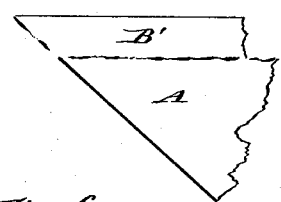
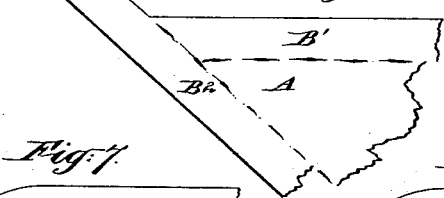 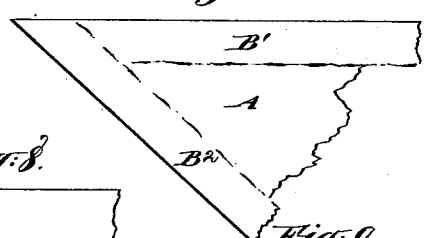
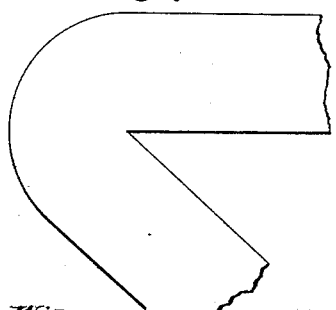 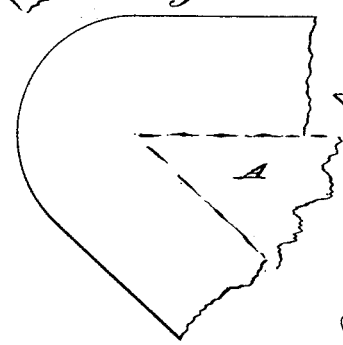 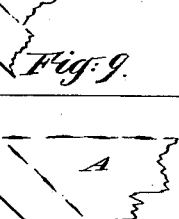
Witnesses:
Charles R. Searle.
Charles F. Barter.
Inventor:
Hermann Esser
By his attorney
Thomas Drew Stetson

UNITED STATES PATENT OFFICE.

HERMANN ESSER, OF HOBOKEN, NEW JERSEY.

MEASURING-SCALE.

SPECIFICATION forming part of Letters Patent No. 431,568, dated July 8, 1890.

Application filed September 25, 1889. Serial No. 325,037. (No model.)

*To all whom it may concern:*

Be it known that I, HERMANN ESSER, a citizen of the United States, residing at Hoboken, in the county of Hudson and State of New Jersey, have invented a certain new and useful Improvement in Measuring-Scales, of which the following is a specification.

The advantages due to imprinting, engraving, or otherwise producing the proper finely-divided scale not directly upon the wood or other material which constitutes the body of the scale, but upon a thin sheet of dense white material adapted to endure the conditions, and which sheet is cemented upon the body either before or after the scale is produced thereon, have long been appreciated. Scales thus constructed in the ordinary flat form, with bodies of box-wood and a veneer of celluloid, have long been in use and are much approved. This mode of construction allows the scale to be very fine, and yet clearly distinct for a long period, by reason of the whiteness and what may be termed "deadness" of the surface, the absence of glistening, and the increased durability of the material due to its greater hardness. There has recently come into use a form of scale in which the cross-section is approximately trefoil, the angles being very acute. Among other advantages due to this form of scale are the convenience of using the wing, which projects upward, as a handle by which the scale may be rapidly and easily moved and exactly adjusted on the paper or other material on which the scale is to be used. This form of scale is particularly convenient for draftsmen in making accurate and complicated drawings of engineering and architectural subjects. I have discovered that by observing proper conditions the thin plates of celluloid or analogous material may be successfully applied on this trefoil form of scale. I have reduced this to practice and produced thereby an important improvement.

The accompanying drawings form a part of this specification, and represent what I consider the best means of carrying out the invention.

Figure 1 is an end view of the complete scale. The succeeding figures are end views of a portion in various stages of the manufacture on a larger scale. Fig. 2 shows the first veneer applied. Fig. 3 shows the same finished by planing. Fig. 4 shows the same with the solvent applied to the exposed beveled edge of the celluloid veneer. I have endeavored to represent the semi-fluid condition of the dissolved surface by a broken or irregular line. Fig. 5 shows the second veneer applied, and Fig. 6 shows the second veneer finished off and the job of attaching and shaping the veneers completed. Figs. 7, 8, and 9 show a modification. In this mode of manufacturing the steps by which the scale is produced are different, but the result is the same. Fig. 7 is a cross-section of a portion of a veneer bent or partly folded. Fig. 8 is a section after such sharply-bent veneer has been cemented to the wood, and Fig. 9 is a section after the exterior has been finished by planing off to produce the desired external angle.

Similar letters of reference indicate like parts in all the figures where they appear.

A is the body, of box-wood, thoroughly seasoned and shaped to the required trefoil-section. Certain portions will be designated, when necessary, by supernumerals, as A. The three lobes or wings are thus separately designated $A'$ $A^2$ $A^3$. Each is formed with two plane-faces, forming an acute angle at the junction on the outer edge of the wing.

The thin sheets or veneers of celluloid are marked $B'$ $B^2$. They are originally of a breadth somewhat greater than the plane faces of the wings. They are cemented one veneer at a time. A semi-fluid coating produced by a partial or complete dissolving by a solvent of the surface of the celluloid which applies against the wood serves well as the cement for joining the veneer thereto.

The sheet $B'$ is first applied and caused to project beyond the wood for a reason which will presently appear. This veneer $B'$ is pressed firmly upon the wood, and held in this position by any suitable clamp. After it has become thoroughly dried, the projecting edge of the celluloid is reduced by planing or other suitable means to coincide exactly with the extended plane of the other side of the wing. After thus shaping, the beveled face of the veneer which is thereby presented is treated with a solution which dissolves the surface, and the face of the other veneer which is to be applied is similarly treated. Thus conditioned, the second veneer is brought into position applying against the other face of the wood and against the beveled edge of the first veneer and extending out beyond it, and now it in its turn is firmly held until the junction is complete. Then, the projecting edge of the last veneer being properly reduced by planing or other mechanical means, each face of the wing is properly coated with a uniform white surface. Both are united in a single homogeneous layer, both faces being properly engraved or impressed with the fine scale desired, the marks being blackened, if desired, and all the wings being similarly treated the scale is complete. It will be understood that the inner edges of each veneer may also project beyond the inner edge of the plane on which it is to lie, and may be properly trimmed off in the process of finishing. Such has been the practice in my experiments, but I do not consider this essential. I propose in ordinary cases to imprint different scales on each of these six plane faces which are thus treated. Figs. 7 to 9 show a method of attaining the same end, but which I consider more laborious. A thin sheet or veneer of celluloid of sufficient width is softened by heat and bent to the proper angle and held until nearly cold, when it is cemented upon the wood, one piece covering both faces. At a later stage the exterior is planed to reduce the rounded contour to a sharp angle. Either method gives a continuous covering.

I claim as my invention—

The trefoil-scale described, having rings $A'$ $A^2$ $A^3$, having acute salient angles, as shown, the rings being faced on the angle and on both faces with a veneer $B'$ $B^2$ in a continuous homogeneous sheet, substantially as herein specified.

In testimony whereof I have hereunto set my hand, at New York, N. Y., this 21st day of September, 1889, in the presence of two subscribing witnesses.

HERMANN ESSER.

Witnesses:
  CHARLES WILLICH, Jr.,
  ALBERT KIMMERLE.

It is hereby certified that in Letters Patent No. 431,568, granted July 8, 1890, upon the application of Hermann Esser, of Hoboken, New Jersey, for an improvement in "Measuring-Scales," an error appears in the printed specification requiring correction, as follows: In lines 39 and 41, page 2, the word "rings" should read *wings;* and that the Letters Patent should be read with this correction therein that the same may conform to the record of the case in the Patent Office.

Signed, countersigned, and sealed this 15th day of July, A. D. 1890.

[SEAL.]
CYRUS BUSSEY,
*Assistant Secretary of the Interior.*

Countersigned:
    C. E. MITCHELL,
        *Commissioner of Patents.*